Patented May 13, 1941

2,241,436

UNITED STATES PATENT OFFICE 2,241,436

PROCESS OF TREATING PEELED POTATOES

Joseph L. Williams, Seattle, Wash.

No Drawing. Application April 1, 1939,
Serial No. 265,507

3 Claims. (Cl. 99—156)

This invention relates to preservative treatment for peeled Irish potatoes, and it has for its principal object to provide a process or treatment that will operate to bleach, preserve and also to prevent peeled potatoes becoming discolored during an extended period of storage awaiting a time of use.

Explanatory to the present invention, it will here be stated that the waste in edible material that is incident to the usual manual and mechanical methods of and devices for peeling potatoes has been recognized by the large users of this product. According to good authorities, the waste due to usual peeling runs between 20% and 30%, and to hotels, restaurants and caterers, this waste or loss has become a matter of great concern. Accordingly, methods have been devised and devices have been made for the removal of the skins of potatoes without waste; such a means being, in one instance, in the nature of a furnace through which the potatoes are passed for a limited application of heat of high temperature whereby to sear the skin and loosen it from the body of the potato so that it may be washed or brushed off without carrying with it any of the edible part of the potato; such a means and method being described in U. S. Patent No. 1,948,884, issued to Patterson on February 27, 1934.

However, the storing of large quantities of peeled potatoes, regardless of the method of peeling, has its disadvantages; one being that unless used within a short period of time, they become discolored, usually turning a dark gray or black. Also, such potatoes soon become moldy and spoil. These above disadvantages have been recognized and processes and methods have been devised whereby to overcome the discoloration and spoiling, as is noted, for example, by reference to U. S. patent to Draper, issued February 27, 1934, No. 1,948,877.

It will here be stated that up to the present time, sulphur dioxide gas has been used occasionally as a preservative, and to prevent discoloration, but with considerable disadvantage; namely, that the treated potato gives off a very disagreeable door and is tainted in taste, and that its percentage of absorption is entirely uncontrollable.

Without going further into detail with reference to methods of peeling and preserving the peeled potatoes for retaining them against discoloration, it will be stated that the present invention has for one of its objects to improve upon the methods as heretofore employed, particularly in the reduction of the quantity of material used in the process; in the reduction in the extent of penetration of the preservative agent into the potáto; in the extent of eliminating taste or odor of the treating agent from the treated product, and in the ease with which the treatment may be carried out.

More specifically stated, the present invention resides in the process and method of treating peeled Irish potatoes with sodium metabisulphite as a bleaching and preservative agent.

In the use of the present process, Irish potatoes peeled by any mechanical, manual or other satisfactory means may be employed, and it is of no particular concern whether the potatoes be old or new, as the treatment has been found applicable to both with satisfactory results.

Furthermore, the treatment may be either before or after the potatoes have been cooked.

The present method comprises exposing the peeled potatoes to a solution of sodium metabisulphite of definite concentration; namely, 2% by weight, such as two grams of the reagent to ninety-eight grams of water, for a certain or definite period of time which has been found satisfactory. In this case, ten minutes is a satisfactory time period of treatment. The concentration and time elements above mentioned are formulated in laboratory experiments wherein a series of reagents were exhaustively tested and this process evolved. A treatment in the solution above mentioned and for the period specified give a penetration of between three-eighths inch and one-half inch into the product. This extent of penetration has been found to be substantially constant for both new and old potatoes and entirely independent of the extent to which the potatoes might have been cooked by a peeling operation which utilized the application of heat. The depth of penetration of the reagent was indicated by the limits of a dark color which developed in the center portion of slices of a treated potato which was exposed to light and air for a short period of time.

The fact that this reagent in the stated concentration and treatment for the specified time gives only a surface penetration, is of particular and decided advantage since it allows and provides protection of the surface of the potato and thereby gives 100% preservation, and likewise, the quantity of the reagent necessary in this treatment is much less than other reagents previously used for this purpose.

In the laboratory, it has been determined by quantitative analysis that through the above stated process, 600 parts of reagent were absorbed to one million parts of potatoes; this percentage showing the maximum efficiency. It may be stated here that the time period for immersion may be varied; also, the process may call for a variation in the concentration of the solution, and the variation may be to increase the concentration and decrease the time of treatment, or vice versa, within certain limitations; of course the necessary result being the absorption of substantially 600 parts of the reagent per million parts of the potatoes.

It also has been found that the absorption of sulphur dioxide increases toward the center of the potato, exactly the reverse of that found to be true using sodium metabisulphite. This increases the cost of such a process and is also a disadvantage along with the disadvantage with respect to odor and taste. In the present instance, no odor or taste that is not natural to the potato is found when using the sodium metabisulphite, which is a considerable advantage. It has been found that this reagent, sodium metabisulphite, also acts as a mold preventative when the potatoes are stored for a considerable period, which also is a decided advantage.

It is thought that the above description of the process is clearly and understandably explained, and its novel features and advantages will be immediately recognizable and apparent.

Having thus described my invention, what I claim as new therein and desire to secure by Letters Patent is—

1. The process of preserving a peeled potato comprising the subjection of the potato to a solution that is two per cent by weight sodium metabisulphite for an interval of time approximately ten minutes.

2. The process of preserving a peeled potato comprising the subjection of the potato to a solution of sodium metabisulphite of a predetermined concentration for a predetermined period of time so as to accomplish the absorption of less than 2,000 parts of sodium metabisulphite in proportion to one million parts of potato.

3. The process of preserving a peeled potato comprising the subjection of the potato to a solution of sodium metabisulphite of a predetermined concentration for a predetermined period of time so as to accomplish the absorption of more than six hundred, and less than two thousand parts of sodium metabisulphite in proportion to one million parts of potato.

JOSEPH L. WILLIAMS.